US006010043A

United States Patent [19]

Williamson et al.

[11] Patent Number: 6,010,043

[45] Date of Patent: Jan. 4, 2000

[54] SELF-CONTAINED, PORTABLE BEVERAGE DISPENSING SYSTEM

[75] Inventors: Ward R. Williamson, Hayward, Wis.; Robert F. Rohlfing, Brainerd, Minn.

[73] Assignee: Draw Box, Incorporated, Hayward, Wis.

[21] Appl. No.: 09/046,257

[22] Filed: Mar. 23, 1998

[51] Int. Cl.[7] ............................ A01C 35/00; B67D 5/62; F25D 11/02; F25D 3/06

[52] U.S. Cl. ................... 222/608; 222/129.1; 222/146.6; 62/441; 62/390; 62/457.1; 62/457.5

[58] Field of Search ................................ 222/129.1, 130, 222/131, 146.6, 608; 62/389, 441, 442, 449, 457.1, 457.4, 457.5, 459, 390, 464

[56] References Cited

U.S. PATENT DOCUMENTS

| | | |
|---|---|---|
| 321,970 | 7/1885 | Hoffman . |
| 683,662 | 10/1901 | Rankin . |
| 1,139,353 | 5/1915 | Ellis . |
| 1,772,111 | 8/1930 | Rice . |
| 1,979,219 | 10/1934 | Bodine . |
| 1,979,549 | 11/1934 | Huckel . |
| 2,080,598 | 5/1937 | Bodenstab . |
| 2,732,977 | 1/1956 | Charpiat . |
| 2,774,229 | 12/1956 | Thau et al. . |
| 2,792,692 | 5/1957 | Bryan . |
| 2,917,906 | 12/1959 | Woolley . |
| 3,106,074 | 10/1963 | Amburgey, Jr. . |
| 3,147,889 | 9/1964 | Dolgin . |
| 3,180,529 | 4/1965 | Buffington . |
| 3,312,083 | 4/1967 | Scoggins et al. . |
| 3,315,846 | 4/1967 | Landis et al. . |
| 3,327,902 | 6/1967 | Alterwitz . |
| 3,331,536 | 7/1967 | De Lorenzo . |
| 3,354,668 | 11/1967 | Cserny . |
| 3,712,514 | 1/1973 | LeBlanc . |
| 4,225,059 | 9/1980 | Kappos . |
| 4,272,968 | 6/1981 | Harvill . |
| 4,617,807 | 10/1986 | Pritchett et al. . |
| 4,651,538 | 3/1987 | Bull et al. . |
| 4,757,920 | 7/1988 | Harootian, Jr. et al. . |
| 4,856,678 | 8/1989 | Stanfill et al. . |
| 5,282,561 | 2/1994 | Mihalich . |
| 5,339,986 | 8/1994 | Mihalich . |
| 5,537,825 | 7/1996 | Ward . |
| 5,553,749 | 9/1996 | Oyler et al. . |

FOREIGN PATENT DOCUMENTS

| | | |
|---|---|---|
| 0 190 811 A2 | 8/1986 | European Pat. Off. . |
| 74623 | 7/1893 | Germany . |

OTHER PUBLICATIONS

A.D.M. Amalgamation, Inc., Coil Cooler Dispensers, Jockey Box Dispensing Systems and Cooler Accessories Price Lists (2 pgs.).

Superior Equipment, Orlando, FL, Miscellaneous Draft Box, Accessories, Price List (1 pg.).

Food Service Equip NEC, SodaMate Enterprises, 2 pg. text, Copyright 1990 Edgell Communications, Inc.

*Primary Examiner*—Kevin P. Shaver
*Assistant Examiner*—Keats Quinalty
*Attorney, Agent, or Firm*—Merchant & Gould P.C.

[57] ABSTRACT

A self-contained portable beverage dispensing system is provided which includes a housing having an interior space. A first cooling well is defined in the interior space of the housing for pre-cooling of a beverage within a beverage container, and a second cooling well is defined in the interior space of the housing for cooling the beverage after it leaves the beverage container. A tank mounting structure is disposed within the interior space of the housing for holding a propellant gas-supply tank, which is used to pressurize the beverage container. The system is thus self-contained, and the two separate cooling wells enhance the cooling of the beverage that is being dispensed.

19 Claims, 9 Drawing Sheets

SELF-CONTAINED, PORTABLE BEVERAGE DISPENSING SYSTEM

FIELD OF THE INVENTION

This invention relates to a beverage dispensing system, and more particularly relates to a self-contained, portable beverage dispensing system for dispensing a chilled beverage without the aid of electricity.

BACKGROUND OF THE INVENTION

A beverage dispensing system should be designed such that the beverage dispensed therefrom is cooled to a desired temperature, so that the beverage can be consumed with maximum enjoyment. Previous systems have utilized various arrangements of ice to either cool a beverage within a beverage container prior to dispensing, and/or to cool the beverage after it leaves the container. A problem with many ice cooling arrangements is that the beverage is not cooled to the desired temperature and/or the cooling effect of the ice is not efficiently utilized. Other systems have utilized electrical cooling arrangements to cool the beverage, again either when the beverage is within the container and/or after it leaves the container. Electrical cooling arrangements, however, are impractical in locations where electricity is not readily accessible, and such arrangements require numerous complicated and expensive components, thereby rendering the dispensing system heavy and difficult to readily transport, as well as increasing the cost of the dispensing system.

In addition to adequately cooling the beverage, a beverage dispensing system should also be readily transportable and self-contained, to allow the system to be used at different locations without the aid of external components such as electrical systems, pressurizing systems, and the like. Factors such as weight and the ease in handling and transporting the system should all be considered when designing a beverage dispensing system.

An example of a beverage dispensing system is disclosed by Mihalich, U.S. Pat. No. 5,282,561. The purpose of the Mihalich system is to ensure that a beverage, which is disclosed as beer, is pre-cooled to a sufficiently low temperature to prevent the formation of foam within the beer. In this system, a beverage container is disposed within an insulated housing, and a thermally conducting ice tray is disposed above the beverage container. A cold plate apparatus is place within the ice tray, and the ice tray is filled with ice for both pre-cooling the beverage within the container through the bottom wall of the ice tray, as well as cooling the beverage that flows through the cold plate. The ice tray thus performs two cooling functions. It is clear from this system, however, that a significant amount of energy is used to cool the interior space of the housing before any cooling of the beverage in the container takes place. In the event that the door to the housing is opened, the cold air within the housing will escape and be replaced by relatively warm air which must be re-cooled by the ice tray, further hastening the melting of the ice as well as delaying any cooling effect on the contents of the beverage container.

What is needed is an improved beverage dispensing system that adequately cools the beverage to maximize the enjoyment of the beverage, and which is self-contained such that the beverage dispensing system is readily transportable. The system should also have a long cooling life to allow extended use of the system and reducing the need to refill the system with a cooling medium.

SUMMARY OF THE INVENTION

The present invention provides a beverage dispensing system for dispensing a chilled beverage, such as beer, wine, soda pop, fruit juices and the like. The present invention provides a beverage dispensing system that is self-contained and readily transportable to different locations, thereby extending the range of uses for the system.

In accordance with one embodiment of the present invention, a self-contained portable beverage dispensing system is provided which includes a housing defining an interior space. A first cooling well is defined in the interior space of the housing for enabling pre-cooling of a beverage within a beverage container, and a second cooling well is defined in the interior space of the housing for cooling the beverage after it has left the beverage container. A tank mounting structure is disposed within the interior space of the housing for holding a propellant gas-supply tank, which is used to pressurize the beverage container.

Due to the use of two separate cooling wells, the beverage is more effectively cooled, compared to the use of a single cooling well. Further, the two cooling wells, which are intended to contain ice or other cooling medium, eliminate the need for an electrically driven cooling apparatus, so that the system does not require electricity to operate. Further, the tank mounting structure securely holds a gas-supply tank within the housing, thereby reducing the likelihood of damage to the gas-supply tank. Additionally, since all the system components are disposed within, or connected to, the housing, the portability of the system is enhanced.

These and various other advantages and features of novelty which characterize the invention are pointed out with particularity in the claims annexed hereto and forming a part hereof. However, for a better understanding of the invention, its advantages and objects obtained by its use, reference should be made to the drawings which form a further part hereof, and to the accompanying description, in which there is described a preferred embodiment of the invention.

DETAILED DESCRIPTION OF THE PREFERRED EMBODIMENT

With reference now to the figures, a self-contained, portable beverage dispensing system 10 in accordance with the principles of the present invention is illustrated. The system 10 is designed to be readily transportable to allow it to be easily moved to different locations, as well as being self-contained to enable the system to be used without electricity.

Figure 1:
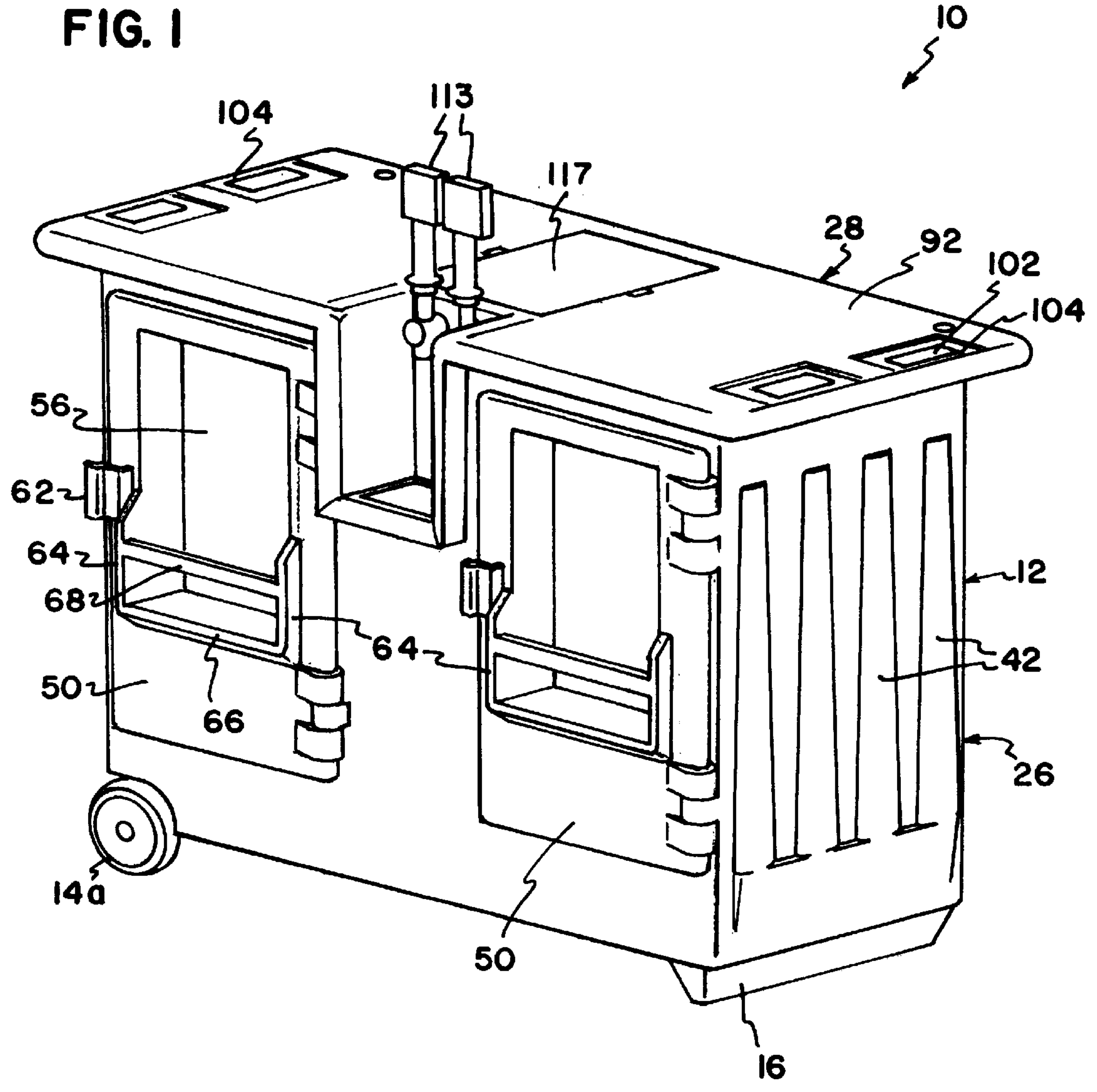
FIG. 1 is a perspective view of the self contained portable dispensing system in accordance with the principles of the present invention.
Figure 2:
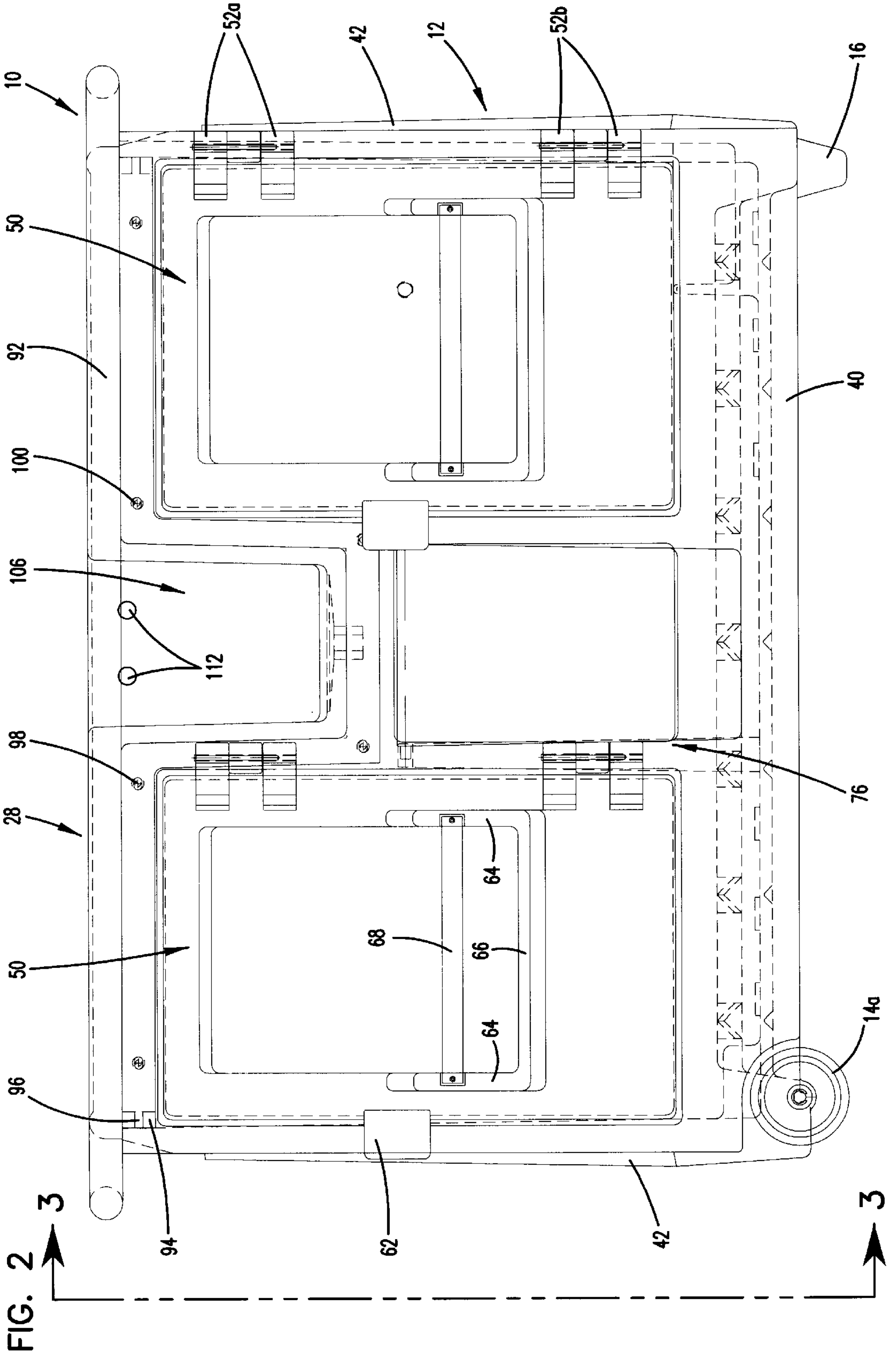
FIG. 2 illustrates a side view of the self contained portable dispensing system in accordance with the present invention, with certain non-visible portions shown in broken lines to emphasize the relative placement of parts.
Figure 3:
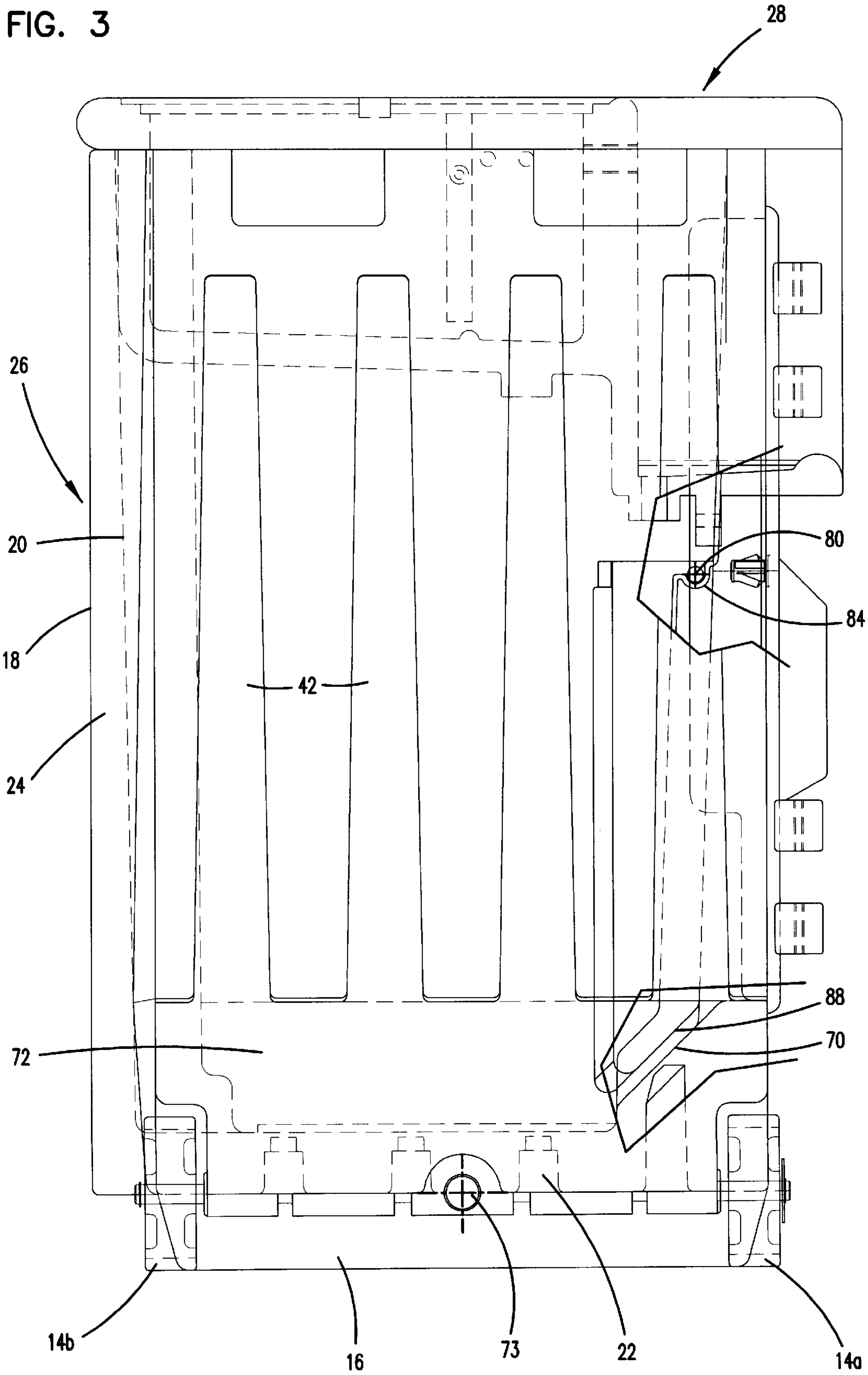
FIG. 3 illustrates an end view of the dispensing system, with parts shown in section, looking in the direction of line 3—3 of FIG. 2.

As shown in FIGS. 1–3, the system 10 includes a generally rectangular housing 12 having wheels 14*a*,14*b* rotatably mounted adjacent the bottom thereof at one end to facilitate transport of the housing. A support leg 16 is disposed at the opposite end of the housing 12 to support the housing at a level position (as shown in FIG. 2) during periods when the housing is not being transported. It is apparent that by lifting the end of the housing opposite the wheels 14*a,b*, the housing can be pulled along the ground from location to location, aided by the wheels which roll on the ground. When the desired location is reached, the end of the housing is lowered so that the leg 16 rests on the floor, ground or other supporting surface to thereby stabily support the housing. If desired, a plurality of support legs could be used instead of the single support leg 16.

The housing 12 is formed generally of a double-walled construction throughout, including an exterior wall 18 and an interior wall 20 spaced from the exterior wall by standoffs 22 to form an air gap or space 24 therebetween. The air gap between the exterior and interior walls give the housing 12 excellent insulative properties to thereby effectively insulate the housing. The two walls 18,20 can be made of any suitable high strength plastic material, such as polypropylene, and the housing 12 can be formed by any of a variety of known techniques, such as rotation molding or injection molding. However, other materials, such as wood or metal, can be used to form the housing, and insulating material, such as insulating foam, could be used to fill the gap between the two walls if desired.

The housing 12 includes a lower housing portion 26 and a lid 28 fastened to the lower housing portion to thereby define an interior housing space 30 which is sized so that at least one beverage container 32 (illustrated in dashed lines in FIG. 4) is able to fit within the housing 12. Preferably the interior space 30 is sized so as to be able to receive two or more beverage containers, and more preferably sized to be able to receive at least three beverage containers 32, although the space 30 could be sized so as to receive only one beverage container, or more than three containers, if desired. Each beverage container 32 holds a supply of a desired beverage, such as beer, wine, soda pop, fruit juice, water, and the like, for subsequent dispensing from the housing. Preferably, the containers 32 hold beer, and the invention will be described herein in relation to the dispensing of beer, although it should be apparent that the dispensing system 10 can be used in conjunction with the dispensing of any beverage that needs to be cooled.

Figure 4:
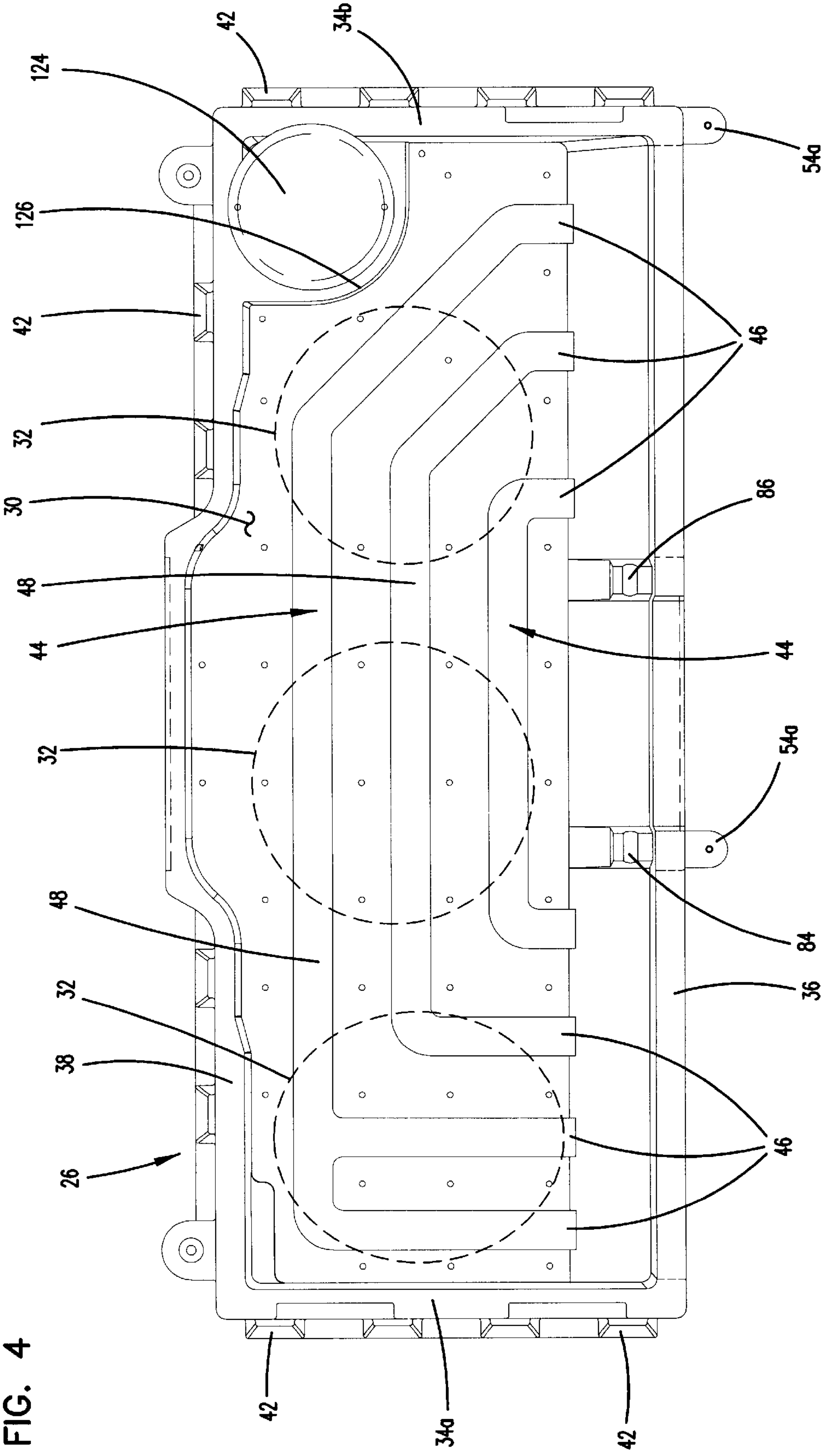
FIG. 4 is a top view of the lower housing portion with the lid removed therefrom for clarity.
Figure 4A:
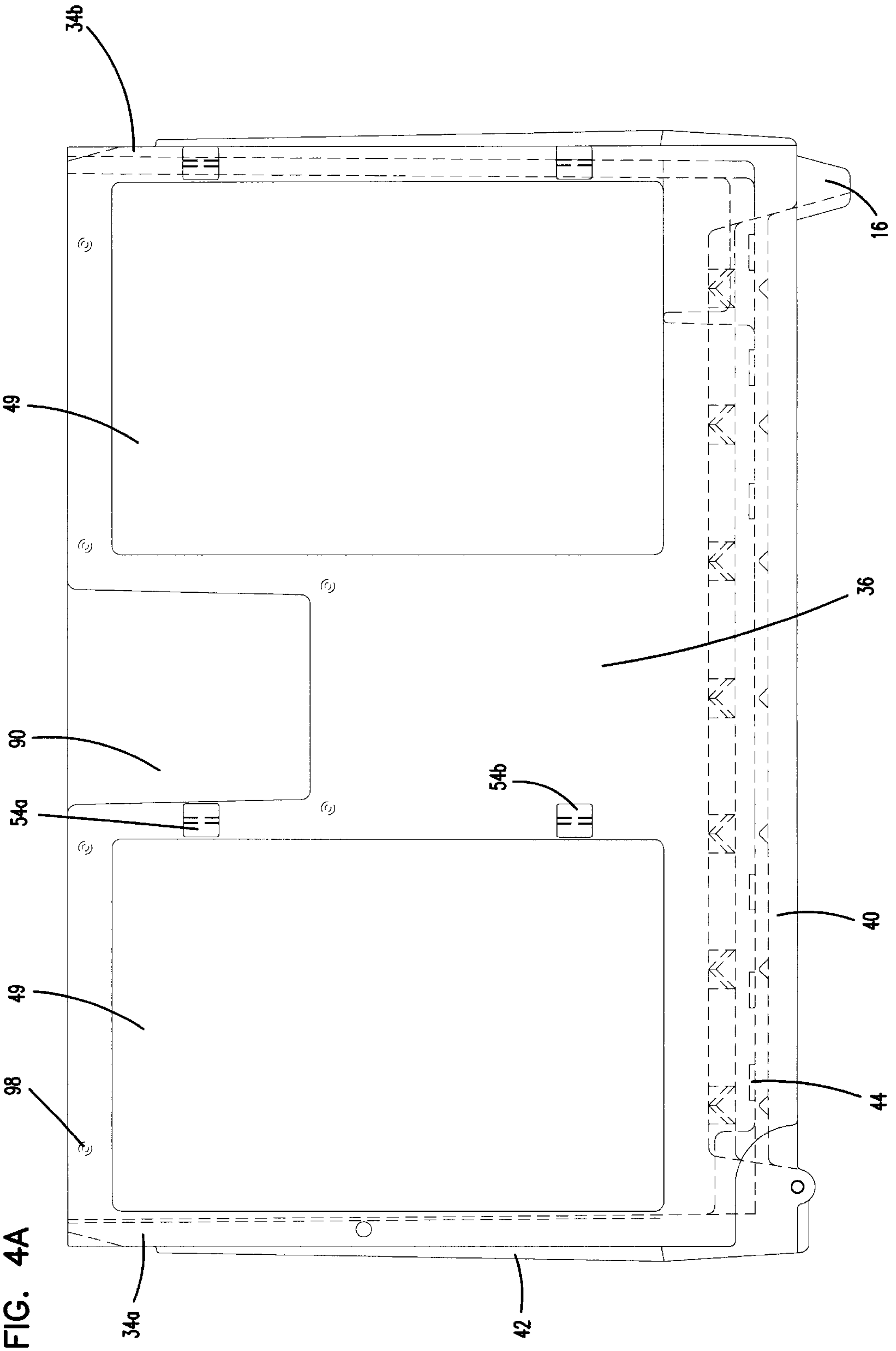
FIG. 4A is a side view of the lower housing portion.

The lower housing portion 26 includes a pair of end walls 34*a*,34*b*, a front wall 36, a rear wall 38 and a bottom wall 40, giving the lower housing portion a box-like appearance with an open top. Each of the walls is formed of the double-wall construction mentioned previously. As best seen in FIGS. 3 and 4, raised ridges 42 are formed in the exterior wall 18 of each end wall 34*a,b* and the rear wall 38 in order to stiffen the lower housing portion. The interior wall 20 of the bottom wall 40 is also provided with a series of raised ridges 44 that extend upward toward the lid 28. As best seen in FIG. 4, the ridges 44 each include transverse portions 46 that extend generally in a direction from the front wall 36 toward the rear wall 38, as well as longitudinal portions 48 that extend parallel to the front and rear walls 36,38. The beverage containers 32 rest upon the raised ridges 44 when disposed within the housing 12, with the transverse portions 46 of the ridges 44 facilitating sliding movement of a beverage container when either inserting or removing a beverage container into or from the housing.

A pair of spaced openings 49 are formed in the front wall 36 to provide access to the interior space 30 through the front wall. Each opening 49 is generally rectangular in shape, and a door 50 is associated with each opening for selectively covering and uncovering the respective opening to thereby control access to the interior space 30. A single door, or three or more doors, could also be used if desired, depending upon the number of openings in the front wall which can also vary. However, it is preferred that two openings and two doors are used.

Figure 8:
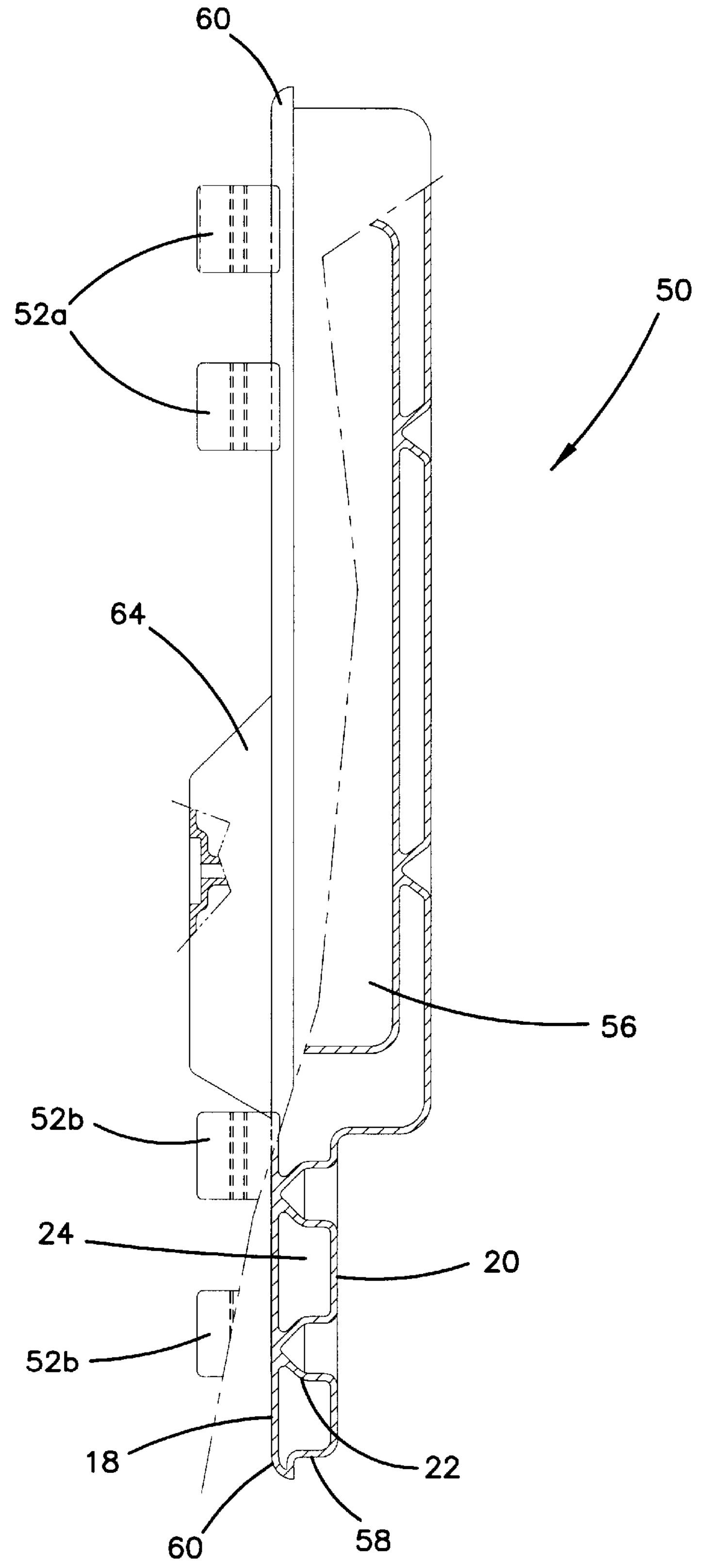
FIG. 8 is an end view, partly in section, of one of the doors.

With reference to FIGS. 1–2 and 8 it can be seen that each door 50 is formed of a double-wall construction, like the walls of the lower housing portion, and the door 50 includes upper and lower spaced bosses 52*a* and 52*b* along one edge thereof which cooperate with upper and lower bosses 54*a* and 54*b* on the front wall 36 of the lower housing portion 26 to permit pivotal connection of each door to the front wall. As should be understood, each of the bosses 52*a*,52*b*,54*a*,54*b* include apertures therethrough which align with each other when the bosses 52*a*,52*b* are disposed on either side of the bosses 54*a*,54*b*, and a pin can then be inserted through the aligned holes to thereby connect the doors to the front wall in a manner which permits each door to be pivoted into either a closed position where the door covers the opening 49, or an open position where the opening 49 is not covered by the door.

Each door 50 includes a recessed portion 56 where the exterior and interior walls 18,20 are bulged toward the interior space 30. Further, an external perimeter 58 of the door is designed to closely fit within the respective opening 49. A rim 60 extends from the external perimeter 58 and engages against the exterior wall 18 surrounding the opening 49 when the door 50 is closed to stop the door at the covering position, as well providing an effective seal between the door and the front wall 36 to prevent escape of cold air from the interior space 30. A tab 62 is connected to the edge of the door opposite the bosses 52*a,b* to permit the door 50 to be retained in the closed position. The tab 62 preferably includes a magnet thereon which engages with a correspondingly located magnet on the front wall 36 when the door is closed in order to maintain the door in the closed position. However, the door can be opened by pulling on either the tab 62 or the rim 60 with sufficient force to overcome the magnetic attraction of the magnets. Although the use of a magnetic mechanism has been described as being used to hold each door closed, other latching mechanisms could be used as well.

The doors 50 are also each provided with a speed rail assembly in order to allow bottles, cans, cups and the like to be held on each door within the recessed portion 56. As best seen in FIGS. 1–2 and 8, each speed rail assembly comprises a pair of spaced, vertically extending ledges 64 projecting outward from the outside surface of the door 50 on either side of the recessed portion 56, and a horizontal ledge 66 is connected to the bottom of the ledges 64 and projects outward from the door at a slight upward angle adjacent the bottom of the recessed portion 56. A bar 68 is connected at each of its ends to the ledges 64 to form a rail in front of the recessed portion 56, thereby forming a shelf, or speed rail, on the exterior of each door. The recessed portion 56 and the ledge 66 thus define an area for bottles, cans, cups and the like to fit, with the bar 68 maintaining the items within the recessed portion 56, to thereby provide a readily accessible source of beverages, cups, etc., in addition to the beer within the container 32.

With reference to the lower cut-out portion in FIG. 3, it is seen that the interior wall 20 includes an angled portion 70 between the front wall 36 and the bottom wall 40. This angled portion 70 extends along the entire length of the lower housing portion 26 between the two end walls 34*a,b*, and is angled downward toward the bottom wall 40 to aid in inserting a full beverage container into the interior space 30 through the opening 49. Since a full beverage container is heavy, a person need only to place the bottom edge of the container on the angled portion 70 whereby the full container 32 will then slide down onto the bottom wall 40. Once on the bottom wall 40, the transverse portions 46 of the ridges 44 facilitate sliding movement of the beverage container 32 on the wall 40 toward the rear wall 38 to properly position the beverage container within the housing.

A first cooling well 72 is generally defined at the bottom of the interior space 30 within the lower housing portion 26 by the bottom wall, end walls, front wall and rear wall, such that a cooling medium, such as ice cubes, placed in the cooling well 72 is in direct contact with the bottom portion of the beverage container to cool the beer within the container 32.

In use, the beverage container is initially placed within the housing 12 so as to rest on the ridges 44 of the bottom wall 40. The ice cubes, or other cooling medium, are then dumped into the housing to fill the cooling well 72, with the ice cubes surrounding the bottom portion of the beverage container. Since the ice is in direct contact with the container 32, the beer within the container is cooled more rapidly. The cooling well 72 is preferably filled with ice until the ice reaches a level just below the level of the openings 49 in the front wall 36, to allow the doors to be closed and preventing ice from falling out of the housing when the doors are opened. It should be noted that the gaps between the raised ridges 44 permit ice cubes to move underneath the beverage container(s) to thereby allow the ice to cool the very bottom of the container, thereby increasing the cooling effectiveness of the first cooling well. A drain 73 is preferably provided adjacent the bottom of the lower housing portion in order to allow drainage of liquid from the interior of the lower housing portion.

Figure 7:
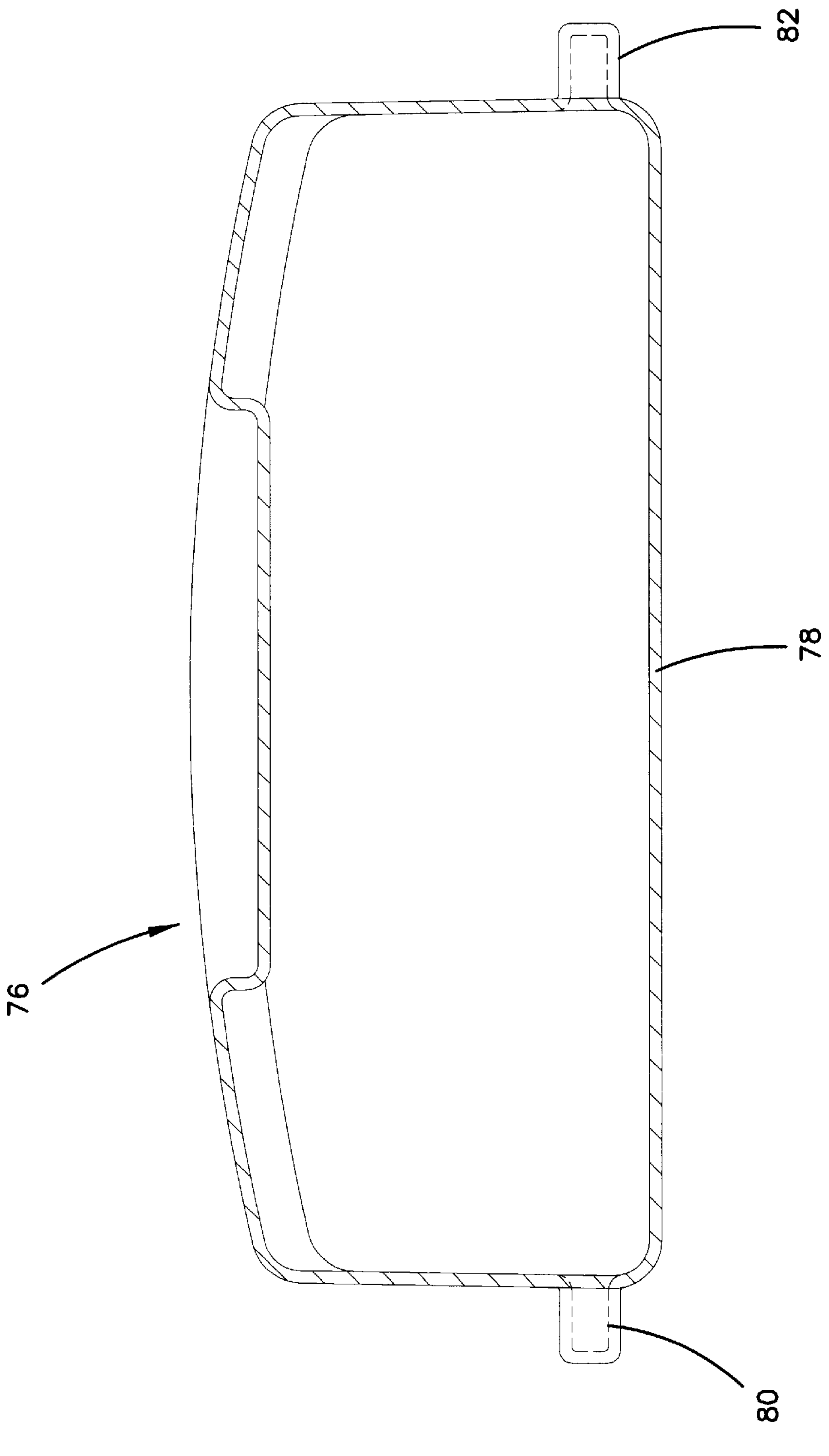
FIG. 7 is a top view of the waste container.

A waste container 76 is removably disposed inside of the lower housing portion 26, and has a wall 78 disposed against the interior wall 20 between the two openings 49. The waste container 76 is shown in dashed lines in FIGS. 2–3 to illustrate its position relative to the lower housing portion. With reference to FIGS. 2–3 and 7, it can be seen that the waste container 76 is a hollow structure having an open top through which waste fluid can enter. A pair of projections 80,82 extend from the waste container 76 adjacent the wall 78, with the projections being sized for disposition within a pair of grooves 84,86, respectively, formed on the interior wall 20. As shown in FIGS. 2–3, by placing the projections 80,82 within the grooves 84,86, the waste container 76 is removably hung on the inside of the lower housing portion 26 with the wall 78 of the waste container resting against the interior wall 20 between the two openings 49. Removal of the waste container 76 is accomplished by opening one of the doors 50 and reaching in through the front wall opening 49 and then lifting the waste container so that the projections are removed from the grooves, and then removing the waste container through the opening 49. As is further illustrated in FIG. 3, the waste container 76 includes an angled bottom wall 88 which engages against the angled portion 70 to thereby retain the waste container in a substantially vertical orientation within the lower housing portion.

The front wall 36 is further provided with a recess 90 located above the location of the waste container 76 and between the two openings 49. The recess 90 is adapted to receive a portion of the lid 28 as will now be described. The lid 28 is formed of the double-wall construction mentioned previously in order to insulate the top of the housing 12. The lid 28 is designed to fit snugly onto the lower housing portion 26 and to be secured thereto, to thereby form the housing 12.

With reference to FIGS. 2–3 and 5–6, it can be seen that the lid 28 includes a generally planar top portion 92 formed by the exterior wall 18, and a rim 94 extends downwardly from the lid along the entire perimeter thereof. The rim 94 is sized to tightly fit within the interior boundary of the lower housing portion 26 defined by the end walls 34*a,b*, front wall 36 and rear wall 38, whereby the lid is disposed on the lower housing portion. The rim 94 is provided with a series of spaced holes 96 which align with corresponding spaced holes 98 on the lower housing portion, and suitable fasteners 100, such as bolts, screws or rivets, are disposed within the aligned holes 96,98 in order to fasten the lid to the lower housing portion.

Figure 5:
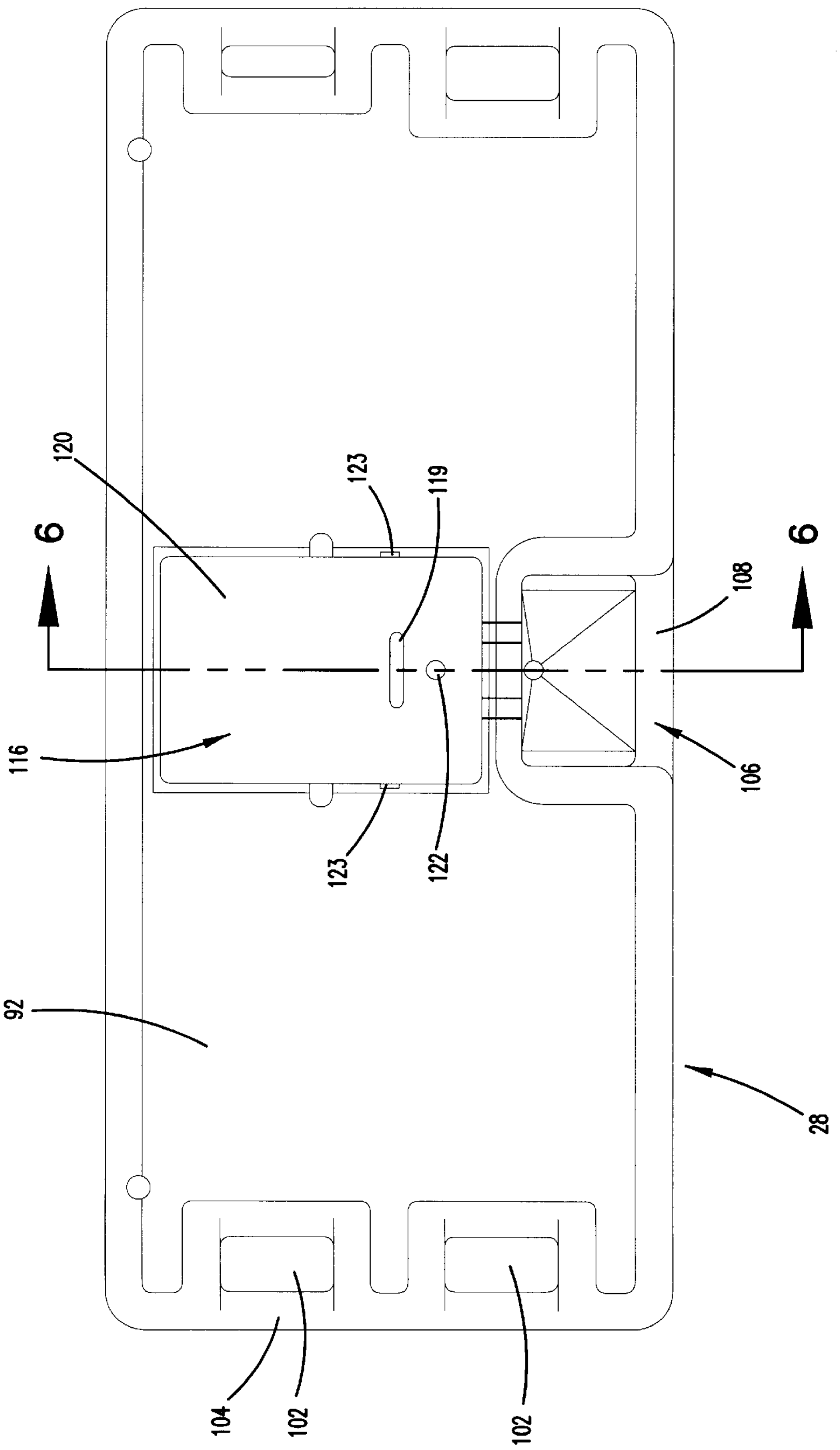
FIG. 5 is a top view of the lid for the housing.

As shown in FIGS. 1–2 and 5, each end of the lid 28 extends past the end walls 34*a,b*, and cut-out portions 102 are formed in the ends of the lid to thereby form handles 104 by which either end of the housing 12 or the entire housing, can be lifted. Thus, the handles 104 allow the end of the housing 12 opposite the wheels 14*a,b* to be lifted and pulled when it is desired to transport the housing 12 to a different location.

The lid 28 is further formed with a dispensing recess 106 at the middle of the front edge thereof which projects downward from the plane of the top portion 92, and which is disposed within the recess 90 in the lower housing portion 26. The dispensing recess 106 provides a convenient location for placing a cup or like as the beer is being dispensed from the container 32 into the cup. The dispensing recess 106 is provided with a bottom wall 108 and a rear wall 110 extending upward from the wall 108, and a pair of dispensing apertures 112 extend through the rear wall 110 at an upper end thereof. The dispensing apertures 112 are each designed so as to receive a conventional dispensing faucet 113 therein, with each faucet extending over the bottom wall 108 so that the beer can be poured from the faucet into a cup which either rests on the bottom wall 108 or is held by hand within the recess 106 under the faucet 113.

Figure 6:
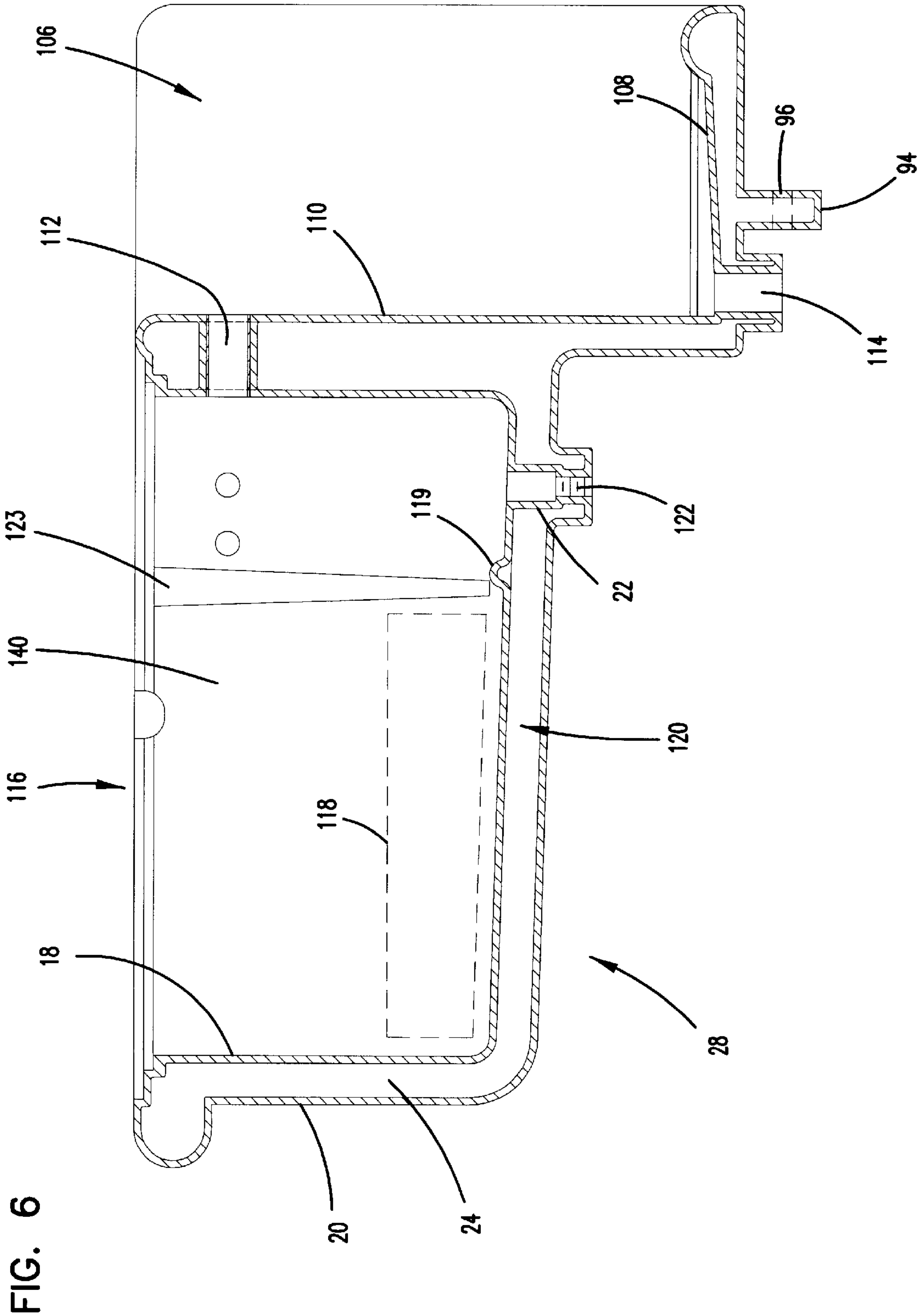
FIG. 6 is a cross-sectional view taken along line 6—6 of FIG. 5.

As best seen in FIGS. 5 and 6, a drain hole 114 is formed through the bottom wall 108 adjacent the rear wall 110, with the drain hole 114 being disposed generally vertically above the waste container 76 so that any spilled beer flows from the dispensing recess 106 and into the waste container. The bottom wall 108 is sloped downward from front to back and from the sides toward the drain hole 114 so that any spilled beer tends to flow into the drain hole 114 and subsequently into the waste container 76.

The lid 28 is also formed with a second cooling well 116 located generally behind the dispensing recess 106. The second cooling well 116 comprises a rectangular depression formed in the planar top portion 92 and forming a cavity 140 extending downward into the interior space 30 of the housing 12. The second cooling well 116 is preferably open at the upper end thereof, and a removable door 117 is secured to the lid to control access to the cooling well as shown in FIG. 1. The cooling well 116, like the rest of the housing 12, is formed of the previously described double-wall construction, and therefore the second cooling well is substantially insulated from the interior space of the housing and therefore performs little or no cooling on the contents of the beverage container(s).

A cold plate 118, illustrated in dashed lines in FIG. 6, is disposed within the second cooling well 116 for further cooling the beer after it has left the container(s) 32. The cold plate 118 is generally conventional in construction and includes a plurality of separate, serpentine flow passage therein, with the passages each being fluidly connected to a respective one of the beverage containers. Since there are two beverage containers, two separate serpentine flow passages are provided in the cold plate, with each passage having an inlet fluidly connected to a tap arrangement on the respective beverage container 32 and an outlet fluidly connected to a respective one of the dispensing apertures 112. However a larger or smaller number of serpentine flow passages in the cold plate could be used if desired. Cold plates 118 and the specifics of their construction are well known in the art, and therefore further description of the cold plate is not believed to be necessary. While the preferred embodiment of the invention utilizes a cold plate within the second cooling well, a coiled tube or tubes could be used in place of the cold plate, with the ice which surrounds the coiled tube heat exchanging with the beer flowing through the coiled tubing in order to cool the beer.

In use, the second cooling well 116 is substantially filled with ice cubes or other cooling medium, with the cold plate 118 being surrounded by the ice so that the beer flowing through the serpentine passages of the cold plate are cooled by heat exchange with the ice cubes. Preferably, the second cooling well 116 includes a cooling wall bottom wall 120 which has a drain hole 122 formed therethrough to allow water from melting ice within the cooling well 116 to drain into the interior space of the housing 12 for subsequent discharge from the drain 73 in the lower housing portion 26. The cooling wall bottom wall 120 is sloped toward the drain hole 122 so that the water tends to flow toward the drain hole. The second cooling well 116 can also be provided with a pair of opposite channels 123 (only one channel being shown in FIG. 6) which allow for insertion of a removable wall (not shown). A ridge 119 is formed on the cooling wall bottom wall 120 of the second cooling well which cooperates with the removable wall (when inserted) to retain the ice directly behind the faucets 113 and thereby further enhance the cooling of the beer.

As should be apparent to one having ordinary skill in the art, the beverage containers 32 are provided with suitable taps or the like to allow the beer to flow from the container, and the taps are fluidly connected to the cold plate 118 using suitable tubing. Further, the dispensing apertures 112 with the faucets secured therein are fluidly connected to the outlets of the cold plate using suitable tubing or the like such that when the faucets are opened, the beer flows from the respective beverage container, through the cold plate, and out of the faucets. The beer, which has been pre-cooled within the container 32 by the ice within the first cooling well 72, is cooled even further as it flows through the cold plate within the second cooling well 116, so that the beer dispensed from the faucet is sufficiently chilled.

As should also be apparent to a person having ordinary skill in the art, the beverage containers 32 need to be pressurized in order to force the beer therefrom when the faucets are opened. For this purpose, the dispensing system 10 is designed to accommodate a propellant gas supply tank, such as a $CO_2$ tank.

With reference to FIG. 4, it is seen that the lower housing portion 26 includes a circular receptacle 124 that is defined by the end wall 34*b*, the rear wall 38 and an arcuate band 126 that extends between the end wall 34*b* and the rear wall 38. The arcuate band 126 is preferably integrally formed with the lower housing portion, and is located approximately midway up the end wall 34*b* and the rear wall 38. The receptacle 124 is sized such that it is slightly greater than the diameter of the propellant gas supply tank, so that the propellant gas supply tank can closely fit within the receptacle 124 and be securely held thereby to prevent shifting and movement of the propellant gas supply tank within the interior space 30. Since the propellant gas supply tank is securely held, safety is increased and damage to the regulator of the propellant gas supply tank is substantially eliminated. The propellant gas supply tank is connected to the beverage containers in a manner known in the art so as to pressurize each beverage container 32.

It is therefore seen that the dispensing system 10 of the present invention is both portable and self-contained, requiring no electricity in order to operate, such that the system can be easily transported to and used in remote locations where access to electrical power is difficult if not impossible. Further, the use of the two separate cooling wells effectively and efficiently cools the beer. Since the first cooling well provides direct heat exchanging contact between the beverage containers and the ice within the first cooling well, the beer is cooled faster and the ice within the housing 12 lasts longer, compared with dispensing systems that utilize indirect heat exchange between a cooling well and a beverage container. The insulated nature of the second cooling well minimizes melting of the ice therewithin, thereby increasing the length of time that the dispensing system can effectively provide cold beer.

It is to be understood that while certain embodiments of the present invention have been illustrated and described, the invention is not limited to the specific forms or arrangements of the parts described and shown.

I claim:

1. A self-contained portable beverage dispensing system comprising:

a housing defining an interior space;

a first cooling well in the interior space of the housing;

a second cooling well extending into the interior space of the housing, the second cooling well being thermally insulated from the first cooling well; and a tank mounting structure within the interior space of the housing for holding a propellant gas-supply tank.

2. The self contained portable beverage dispensing system according to claim 1, further comprising a beverage container disposed within the interior space of the housing, and a faucet mounted on the housing, said faucet being fluidly connected to said beverage container.

3. The self contained portable beverage dispensing system according to claim 1, wherein said housing is of double-wall construction including an interior wall and an exterior wall, and the interior wall and the exterior wall being made of a plastic material.

4. The self contained portable beverage dispensing system according to claim 1, wherein said mounting structure comprises a receptacle within said housing.

5. The self contained portable beverage dispensing system according to claim 1, further comprising wheels connected to a first end of said housing, and including at least one support leg connected to a second, opposite end of said housing.

6. The self contained portable beverage dispensing system according to claim 1, wherein said housing comprises a lower housing portion and a lid connected thereto, said first cooling well being located in the lower housing portion and said second cooling well being connected to said lid.

7. The self contained beverage dispensing system according to claim 6, wherein said second cooling well comprises a depression integrally formed in the lid.

8. The self contained portable beverage system according to claim 7, wherein said second cooling well includes a cooling well bottom wall and a drain hole is formed through said cooling well bottom wall.

9. The self contained portable beverage dispensing system according to claim 7, wherein said lid includes a dispensing recess integrally formed therewith, and further including a first drain disposed at a lower portion of said dispensing recess.

10. The self contained portable beverage dispensing system according to claim 9, further comprising a waste container removably mounted in said lower housing portion and disposed underneath said first drain to catch fluid from said first drain.

11. The self contained portable beverage dispensing system according to claim 10, wherein said lower housing portion includes a pair of cup-shaped grooves defined therein, and said waste container includes a pair of projections removably disposed within said cup-shaped grooves.

12. The self contained portable beverage dispensing system according to claim 9, wherein said second cooling well is located behind said dispensing recess.

13. The self contained portable beverage dispensing system according to claim 6, further including a cold plate disposed in said second cooling well.

14. The self contained portable beverage dispensing system according to claim 6, wherein said lower housing portion includes a bottom wall and a front wall extending upward from said bottom wall, said front wall including an opening therein providing access to the interior space, and further including a door for selectively covering and uncovering the opening.

15. The self contained portable beverage dispensing system according to claim 14, wherein said bottom wall includes a plurality of ridges defined thereon, each said ridge including a generally transverse ridge portion and a longitudinal ridge portion.

16. The self contained portable beverage dispensing system according to claim 14, further including an angled wall portion between the bottom wall and the front wall.

17. The self contained portable beverage dispensing system according to claim 14, further comprising a speed rail assembly connected to the door.

18. The self contained portable beverage dispensing system according to claim 17, wherein the door includes a recessed portion, and said speed rail assembly includes a bar extending across the recessed portion.

19. The self contained portable beverage dispensing system according to claim 14, further including a plurality of said openings in said front wall and a plurality of said doors for selectively covering and uncovering said plurality of openings.

* * * * *